US012701034B1

(12) United States Patent
Harper

(10) Patent No.: US 12,701,034 B1
(45) Date of Patent: **\*Aug. 4, 2026**

(54) AFTERMARKET WIRELESS GATEWAY ADAPTATION FOR INTERNAL COMBUSTION ENGINE CONTROL MODULE CONNECTION

(71) Applicant: Inpro/Seal LLC, Rock Island, IL (US)

(72) Inventor: Trevor Harper, Boerne, TX (US)

(73) Assignee: Inpro/Seal LLC, Rock Island, IL (US)

( \* ) Notice: Subject to any disclaimer, the term of this patent is extended or adjusted under 35 U.S.C. 154(b) by 299 days.

This patent is subject to a terminal disclaimer.

(21) Appl. No.: 18/393,348

(22) Filed: Dec. 21, 2023

Related U.S. Application Data

(63) Continuation of application No. 16/780,219, filed on Feb. 3, 2020, now Pat. No. 11,855,807.

(60) Provisional application No. 62/800,237, filed on Feb. 1, 2019.

(51) Int. Cl.
| | |
|---|---|
| *G01M 15/02* | (2006.01) |
| *B60R 16/023* | (2006.01) |
| *G01M 15/04* | (2006.01) |
| *G07C 5/00* | (2006.01) |
| *G07C 5/08* | (2006.01) |
| *H01R 13/6591* | (2011.01) |
| *H04L 12/66* | (2006.01) |
| *H04W 88/16* | (2009.01) |
| *G16Y 20/20* | (2020.01) |
| *G16Y 40/10* | (2020.01) |
| *G16Y 40/20* | (2020.01) |

(52) U.S. Cl.
CPC ............ *H04L 12/66* (2013.01); *B60R 16/023* (2013.01); *G01M 15/02* (2013.01); *G01M 15/04* (2013.01); *G07C 5/008* (2013.01);

*G07C 5/0808* (2013.01); *H01R 13/6591* (2013.01); *H04W 88/16* (2013.01); *G16Y 20/20* (2020.01); *G16Y 40/10* (2020.01); *G16Y 40/20* (2020.01)

(58) Field of Classification Search
CPC ...... G01M 15/02; G01M 15/04; G07C 5/008; G07C 5/0808
USPC ....................................................... 73/114.01
See application file for complete search history.

(56) References Cited

U.S. PATENT DOCUMENTS

| | | | |
|---|---|---|---|
| 10,141,271 B1 | 11/2018 | Xu et al. | |
| 11,855,807 B1 \* | 12/2023 | Harper ................... | G07C 5/008 |
| 2004/0185716 A1 | 9/2004 | Kimura et al. | |
| 2008/0072394 A1 | 3/2008 | Yan | |
| 2015/0276239 A1 | 10/2015 | Fadell et al. | |

(Continued)

*Primary Examiner* — Peter J Macchiarolo
*Assistant Examiner* — Rodney T Frank
(74) *Attorney, Agent, or Firm* — Fish & Richardson P.C.

(57) ABSTRACT

A compact wireless Internet of Things (IOT) gateway for use with industrial internal combustion engines having an engine control module (ECM). The IOT gateway incorporates components, such as a cellular modem and cellular antenna, that enable the IOT gateway to receive, process, and transmit data, particularly performance data related to the engine on which the IOT gateway is mounted. The IOT gateway includes both male and female connectors for connecting to both an ECM and a wire harness assembly on the internal combustion engine. Features of the IOT gateway enable remote monitoring of electronic performance data of the internal combustion engine, as well as updating and reconfiguring control software of the internal combustion engine.

15 Claims, 5 Drawing Sheets

(56)     References Cited

U.S. PATENT DOCUMENTS

| | | |
|---|---|---|
| 2019/0335599 A1 | 10/2019 | Chi et al. |
| 2020/0133257 A1 | 4/2020 | Cella et al. |
| 2020/0146550 A1 | 5/2020 | Tunnell et al. |

* cited by examiner

AFTERMARKET WIRELESS GATEWAY ADAPTATION FOR INTERNAL COMBUSTION ENGINE CONTROL MODULE CONNECTION

CROSS REFERENCE TO RELATED APPLICATIONS

This application is a continuation application of and claims priority under 35 U.S.C. § 120 to U.S. application Ser. No. 16/780,219, filed on Feb. 3, 2020, which will issue as U.S. Pat. No. 11,855,807, which claims the benefit of U.S. Provisional Application Ser. No. 62/800,237, filed on Feb. 1, 2019, the contents of each of which are hereby incorporated by reference.

BACKGROUND

1. Field

The disclosed embodiments relate to internal combustion industrial engines of the type that have engine control modules (ECM's) networked with various sensors and other subsystems of the engine through use of a wire harness and multi-pin connectors. More particularly, the disclosed embodiments relate to control software and the corresponding electronic performance data of such existing internal combustion industrial engines and, even more particularly, to enabling the remote monitoring of the electronic performance data of such engines and to enabling the updating and reconfiguring of the control software of such engines.

2. Description of Related Art

Though internal combustion engines operating in industrial environments have long been embedded with sensors to enable more sophisticated control of the engine's operation, only in the last few years have companies began to explore the potential application of the Internet of Things (IOT) in engines. In the past, data has been collected from engines in industrial environments by people using dedicated data collectors, often recording sensor data on media such as a hard drive for later analysis. Data is commonly returned to a central office or data center for analysis, after which the analysis can be used as a basis for diagnosing problems in an operating environment and/or suggesting ways to improve operations. This work has traditionally taken place on a time scale of weeks or months, and has been directed to limited data sets.

Increased use of IOT devices have led to an increase in low-power wide-area (LPWA) networks. Cellular modems in IOT devices now have embedded LPWA modules for receiving, processing, and transferring data. For example, Telit® has several LPWA modules that use LTE Cat 1, LTE-M (Cat M1), and NB-IOT (Cat NB1) cellular technologies. LTE Cat 1 has maximum downlink data rates of 10 Mbps and maximum uplink data rates of 5 Mbps. LTE Cat 1 devices are low cost and low power, enabling fast implementation in IOT applications and machine-to-machine communications, where these advantages outweigh the need for fast data rates. LTE-M devices are tailored for IOT applications and provide low power usage and enhanced network range, with maximum downlink and uplink data rates of 1 Mbps. LTE-M devices provide enhanced coverage with up to +15 dB in maximum coupling loss (MCL) compared to other cellular technologies. Narrowband IOT (NB-IOT) devices have optimized power features such as a power saving mode (PSM) and an extended Discontinuous Reception (eDRX), enabling the devices to wake up only periodically to deliver small amounts of data, thereby enabling longer battery life. NB-IOT has low bandwidth with a maximum downlink rate of 250 Kbps and a maximum uplink rate of 20 Kbps (single-tone). NB-IOT also provides enhanced coverage up to +20 dB in MCL compared to other cell technologies.

The development of IOT technology has made it possible to connect continuously to a significantly larger range of devices. More complex industrial environments remain more difficult, as the range of available data is often limited, and the complexity of dealing with data from multiple sensors makes it much more difficult to produce "smart" solutions that are effective for the industrial sector. The ability to receive immediate information regarding engine performance from engine control modules is currently lacking. Therefore, there is a need in the art for improved methods and systems for data collection from engine control modules, as well as for improved methods and systems for using collected data to provide improved monitoring, control, diagnosis of problems, and optimization.

SUMMARY

The disclosed embodiments relate to a new high-performance, easy-to-use, Internet of Things (IOT) gateway for industrial engines. The IOT gateway is a plug and play physical device that connects to an engine control module (ECM), automatically detects what type of ECM it is connected to by referencing a lookup table of known configurations, readily adapts in-line so the solution can be used on conventional engines that do not already have an IOT connection, aggregates data received from the ECM, auto configures it for processing, processes sensor data, and transfers the data to the cloud (the Internet) so the data can be displayed and manipulated with user-friendly interfaces. It should be recognized that other industrial systems and processes may incorporate the IOT gateway to take advantage of its numerous features and capabilities as described herein. The software in this chip is also remotely configurable so once the IOT Gateway is installed, the user can remotely trigger the device to auto configure the types of data to be sent and at what frequency that data needs to be sent for that particular ECM/engine. Being remotely configurable, the data center or remote office can also select different data sets to collect, different frequencies to collect the data sets, and take snapshots of event logging. This device and chip allow split tunnel functionality, allowing a user to apply software patches to improve performance and "bounce" (restart) the device if there seems to be an issue. The IOT also has several protective mechanisms such as the functionality to monitor its power consumption/protect against power surges, data encryption/VPN and password support, a buffer to prevent data loss if communications are interrupted and can be programmed to shut the engine down if specified emergency criteria are reached. The device is also programmable in 35 different languages.

The IOT gateway has multiple components enabling it to receive, process, and transmit data. A cellular antenna enables the IOT gateway to receive and transmit cellular data and is key to the Gateway's remote connectivity. An electromagnetic (EM) shield inside the IOT gateway, located against the bottom of the Gateway, allows EM waves to be transmitted and received by the internal cellular antenna without affecting the ECM with electromagnetic interference. Additionally, an external antenna port has been added to further enhance the data communication if the customer so desires. Also inside, a cellular modem has an embedded LPWA module to allow the device a long charge life with an extended coverage area. There are several known LPWA modules that may be implemented in disclosed embodiments. For example, Telit® has LPWA modules that use LTE Cat 1, LTE-M (Cat M1), and NB-IOT (Cat NB1).

BRIEF DESCRIPTION OF THE DRAWING FIGURES

A better understanding of the disclosed device may be had by reference to the drawing figures.

DETAILED DESCRIPTION OF THE EMBODIMENTS

The following descriptions relate to presently preferred embodiments and are not to be construed as describing limits to the invention, whereas the broader scope of the invention should instead be considered with reference to the claims, which may be now appended or may later be added or amended in this or related applications. Unless indicated otherwise, it is to be understood that terms used in these descriptions generally have the same meanings as those that would be understood by persons of ordinary skill in the art. It should also be understood that terms used are generally intended to have the ordinary meanings that would be understood within the context of the related art, and they generally should not be restricted to formal or ideal definitions, conceptually encompassing equivalents, unless and only to the extent that a particular context clearly requires otherwise.

For purposes of these descriptions, a few wording simplifications should also be understood as universal, except to the extent otherwise clarified in a particular context either in the specification or in particular claims. The use of the term "or" should be understood as referring to alternatives, although it is generally used to mean "and/or" unless explicitly indicated to refer to alternatives only, or unless the alternatives are inherently mutually exclusive. When referencing values, the term "about" may be used to indicate an approximate value, generally one that could be read as being that value plus or minus half of the value. "A" or "an" and the like may mean one or more, unless clearly indicated otherwise. Such "one or more" meanings are most especially intended when references are made in conjunction with open-ended words such as "having," "comprising" or "including." Likewise, "another" object may mean at least a second object or more.

Figure 1:
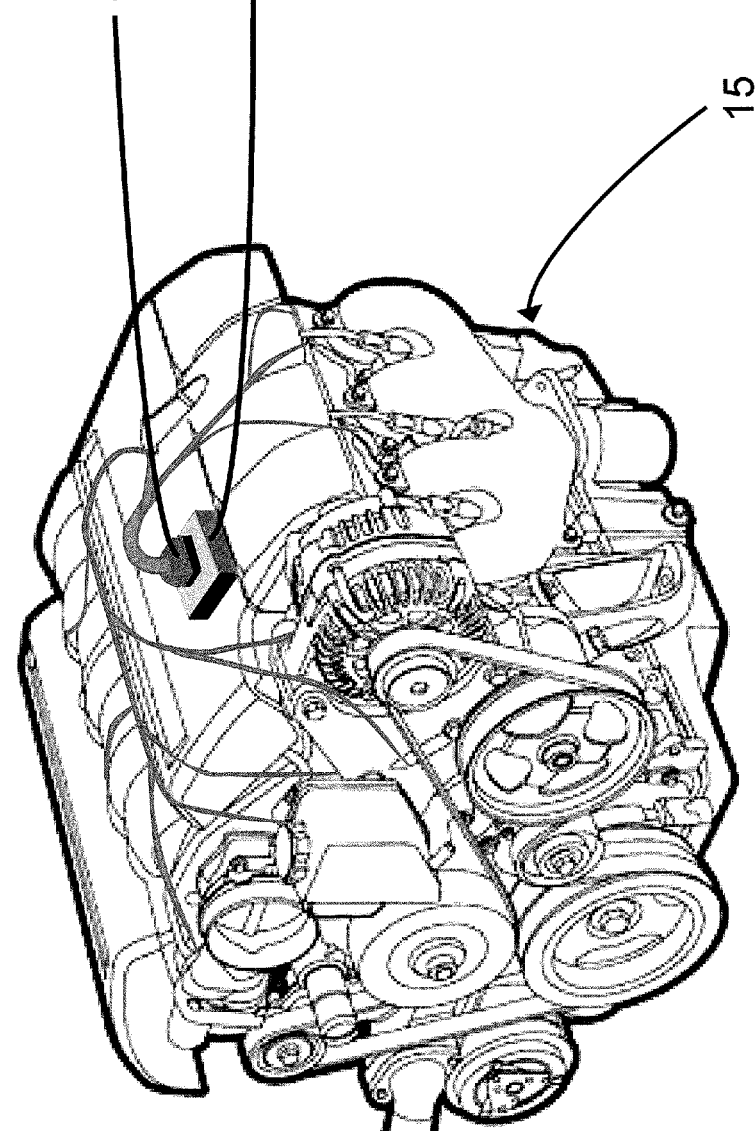
FIG. 1 is a prior art depiction of a known engine with a known engine control module (ECM) and a known wire harness assembly connector.

Shown in FIG. 1 (not to scale) is a known engine 15 with a known engine control module (ECM) 16 and a known wire harness assembly connector 17. The wire harness assembly connector 17 connects to a wire harness with multiple wires connected to various components in engine 15. Engine 15 is shown here as an example but there are numerous industrial engines that utilize ECM 16 and assembly connector 17.

Figure 2:
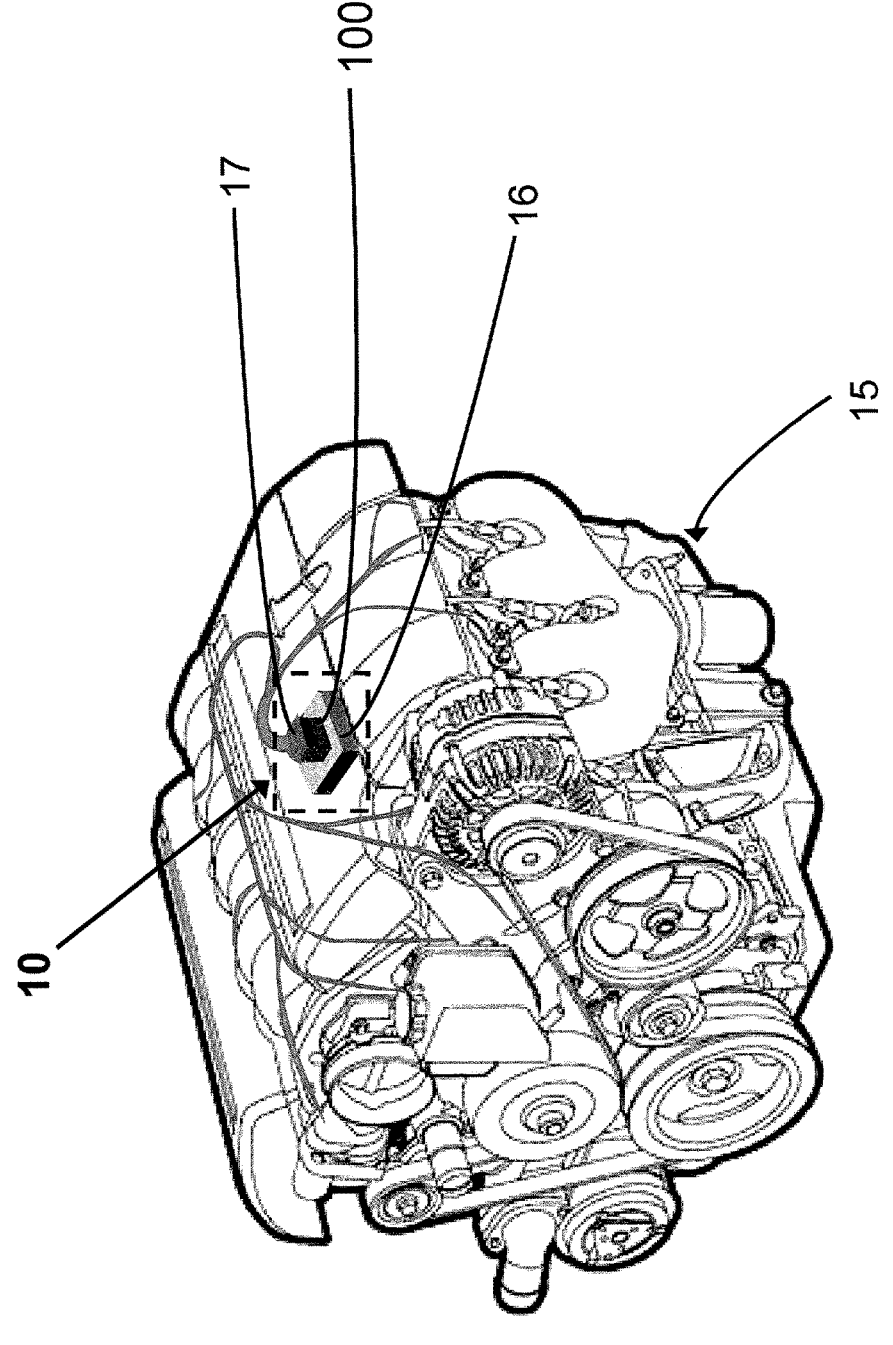
FIG. 2 is an isometric view of a preferred embodiment 10 of the disclosed system mounted to a known industrial engine system.

Turning to FIG. 2 (not to scale), there is shown a preferred embodiment 10 of the disclosed system mounted to industrial engine 15. Preferred embodiment 10 includes ECM 16 mounted to engine 15, IOT gateway 100 mounted to ECM 16, and wire harness assembly connector 17 mounted to IOT gateway 100. In preferred embodiment 10, IOT gateway 100 connects directly to ECM 16.

Figure 3A:
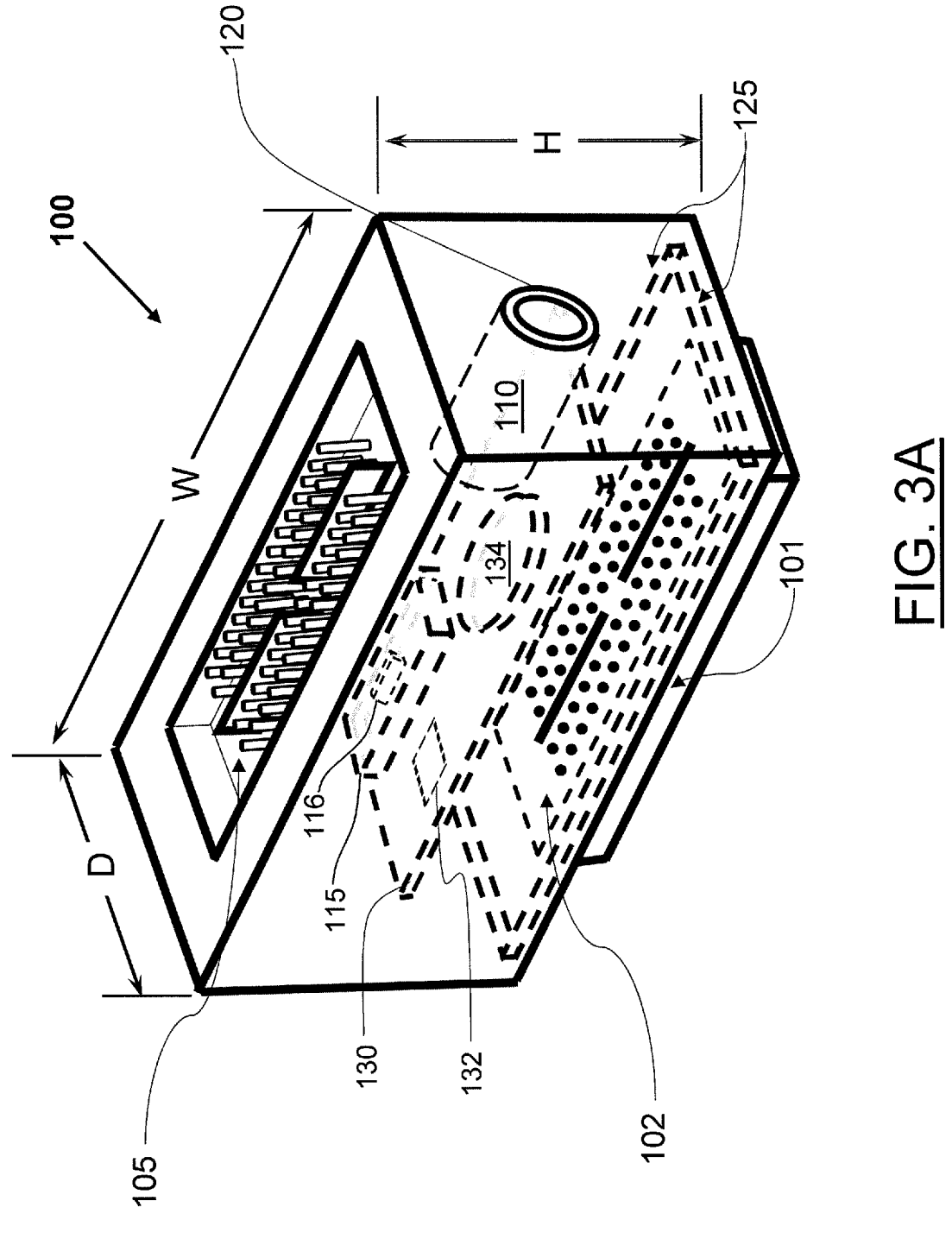
FIG. 3A is an isometric view of a preferred embodiment 10 including the IOT gateway and showing the multiple connectors unattached.

Turning to FIG. 3A, there is shown an isometric view (not to scale) of a preferred embodiment 10 including the IOT gateway 100, which is 2 inches or less in height. IOT gateway 100 has a 56-pin male connector 105 which connects to a female end of wire harness assembly connector 17 (shown in FIG. 2). It should be noted that the total surface area of the IOT gateway 100 is less than twice the total area consumed by the connector when attached, making the IOT gateway 100 only slightly larger than the connector. At the bottom of FIG. 3A, there is a female (sockets shown as 102) ECM connector (body shown as 101) which connects to a male end of a 56-pin connector found on ECM 16. The 56-pin male connector 105 on top of the IOT gateway 100 includes two horizontal plastic guides. These guides are also found on the ECM male connector (not shown), and there are corresponding vacancies within the female ECM connector body 101 of IOT gateway 100 to guide and ensure the male pins are properly seated within the female ECM connector body 101.

IOT gateway 100 also includes a printed circuit board (PCB) 130 having various electronic components installed thereon. One such component is a microprocessor 132 for controlling various functional aspects of IOT gateway 100. PCB 130 further includes a Global Positioning System (GPS) module 134.

In order to prevent electromagnetic (EM) radiation from damaging the circuit board of ECM 16, an EM shield 125 may be implemented across the bottom section of IOT gateway 100. Above the surface of EM shield 125, there is shown a cellular antenna 110 and cellular modem 115. The EM shield 125 would preferably be constructed of metal and direct EM radiation away from ECM 16. On the upper right side of the IOT gateway 100 is an external antenna port 120. This external port is depicted as a male coaxial port but may be one of several other types of ports available, depending on user needs and the environment in which the IOT gateway 100 will be used. To attach a coaxial antenna (not shown), one would simply insert the male pin into the center of the female connector and screw the two connectors together.

IOT gateway 100 has several important features enabling efficient network connectivity. IOT gateway 100 is compact, its dimensions are preferably 2 inches wide (W), 1 inch in height (H), and 1 inch deep (D), although other sizes are possible depending on particular implementations and requirements. When operatively mounted, IOT gateway 100 is sealed and weather resistant. IOT gateway 100 is in compliance with required FCC carrier standards. The compact size enables IOT gateway 100 to be produced at low cost and low form factor. IOT gateway 100 communicates with ECM 16 via controller area network (CAN) protocol.

Figure 3B:
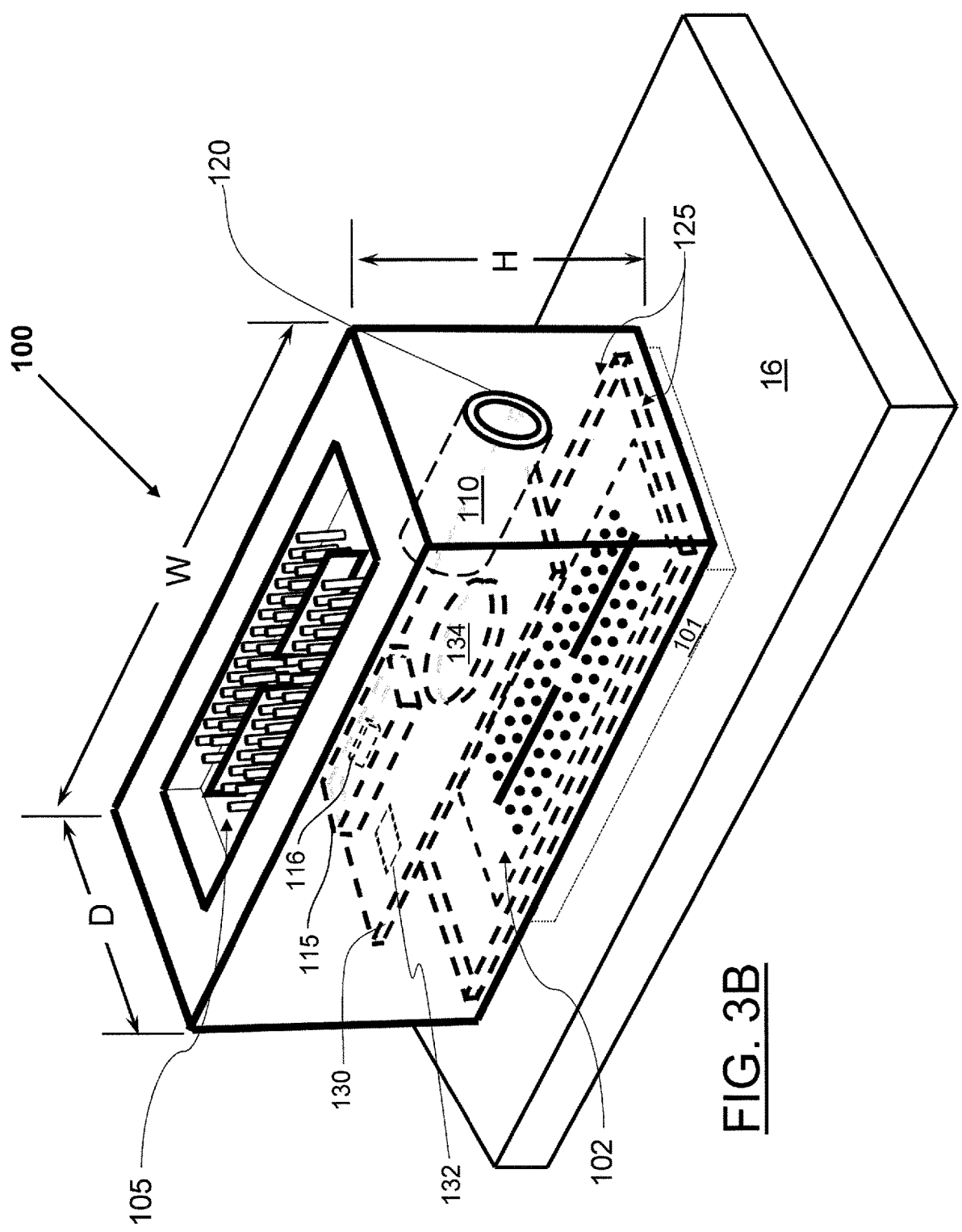
FIG. 3B is an isometric view of a preferred embodiment 10 including the IOT gateway mounted to the ECM without the wiring harness connected to the top connector of the IOT Gateway.

Turning to FIG. 3B, there is shown an isometric view (not to scale) of a preferred embodiment 10 including the IOT gateway 100 mounted to ECM 16. The dimensions are preferably less than 2 inches in height, less than 4 inches wide, and less than 2 inches depth. As shown at the bottom of preferred embodiment 10, IOT gateway 100 has the female ECM connector body 101 mated with the 56-pin male connector (not shown) which joins the 56 female connector sockets 102 of IOT gateway 100. The dashed lines indicate that, when IOT gateway 100 is connected to ECM 16, female ECM connector body 101 is embedded within ECM 16 and is not readily visible while IOT gateway 100 is mounted thereon. The external antenna port 120 is also found on the upper right side of IOT gateway 100.

Figure 4:
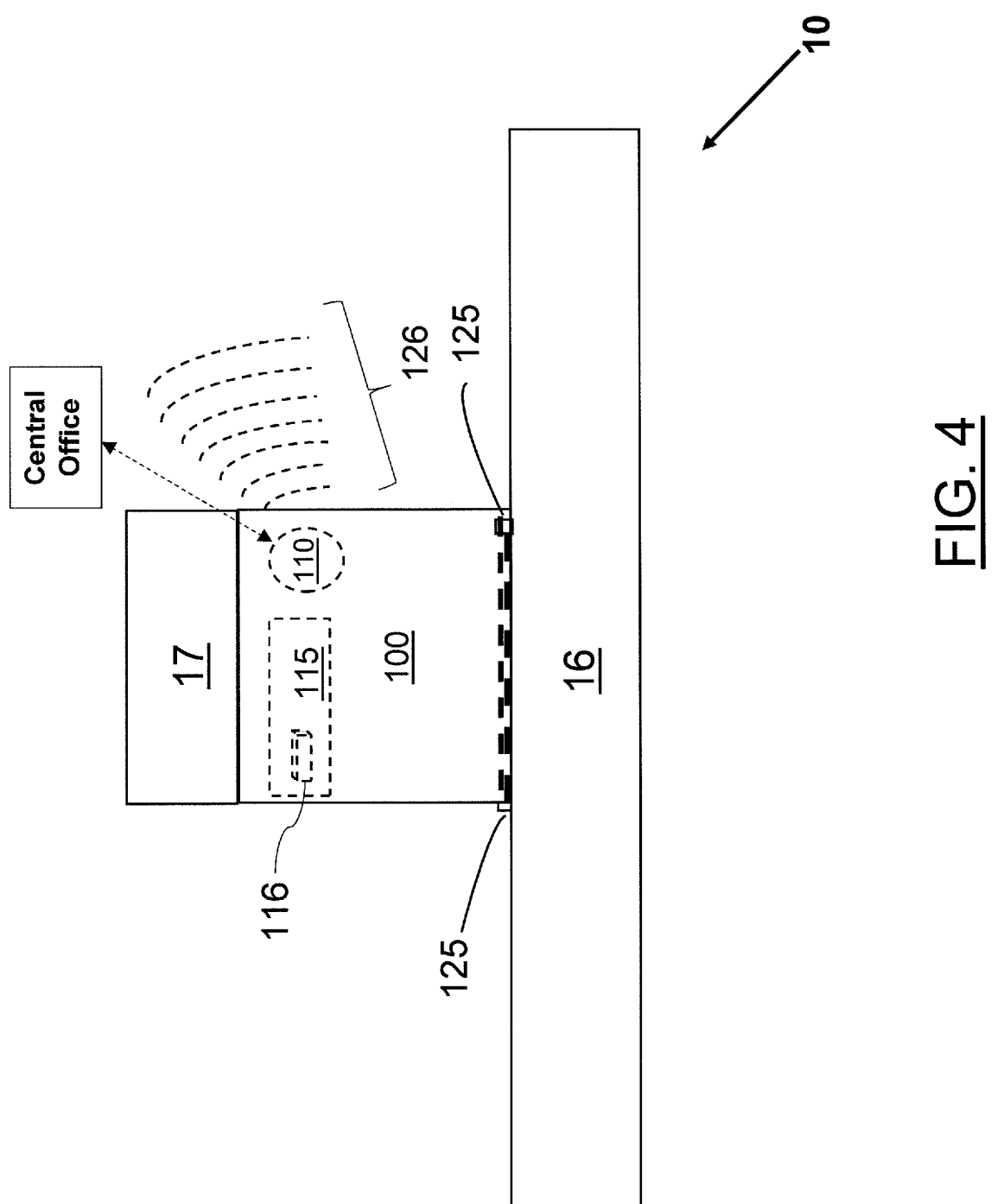
FIG. 4 is a side view of a preferred embodiment 10 with the Gateway mounted on the ECM and connected to a wiring harness (wires not shown).

Turning to FIG. 4, there is shown a side view (not to scale) of preferred embodiment 10. Cellular antenna 110 enables IOT gateway 100 to receive and transmit cellular data. Located nearby on the outside of the IOT gateway 100 is the external antenna port 120 to further enhance the data communication capabilities of the cellular antenna 110. IOT gateway 100 appears in FIG. 4 to have two thin layers on the bottom, as a result of the lower section being protected by EM shield 125. As shown, EM shield 125 would not extend up the sides of the IOT gateway 100, allowing EM waves 126 to be transmitted and received by cellular antenna 110 without affecting ECM 16. A cellular modem 115 has an embedded low-power wide-area (LPWA) module 116. There are several known LPWA modules that may be implemented in disclosed embodiments. For example, Telit® has LPWA modules that use LTE Cat 1, LTE-M (Cat M1), and NB-IOT (Cat NB1). Other LPWA modules suitable for the purposes of the disclosed embodiments are contemplated by the inventor.

While the IOT gateway has been disclosed according to preferred and alternate embodiments, those of ordinary skill in the art will understand that still other embodiments have been enabled according to the foregoing disclosure. Such other embodiments shall fall within the scope and meaning of the appended claims. Hence the drawings and detailed descriptions herein should be considered illustrative, not exhaustive. They do not limit the invention to the particular forms and examples disclosed. To the contrary, the invention includes many further modifications, changes, rearrangements, substitutions, alternatives, design choices, and embodiments apparent to those of ordinary skill in the art, without departing from the spirit and scope of this invention. In any case, all substantially equivalent systems, articles, and methods should be considered within the scope of the invention and, absent express indication otherwise, all structural or functional equivalents are anticipated to remain within the spirit and scope of the presently disclosed systems and methods.

What is claimed is:

1. An Internet of Things (IOT) gateway for use with an engine control module (ECM) and a wire harness assembly connector (WHAC), the ECM being operatively mounted on an internal combustion industrial engine, the IOT gateway comprising:

an enclosure;

an IOT female connector configured for first operative connection to a corresponding ECM male connector of the ECM, wherein the IOT female connector is the same as a WHAC female connector of the WHAC such that each of the IOT female connector and the WHAC female connector are configured for operative connection with the ECM male connector;

an IOT male connector configured for second operative connection to the corresponding WHAC female connector, wherein the IOT male connector is the same as the ECM male connector such that each of the IOT male connector and the ECM male connector are configured for operative connection with the WHAC female connector, wherein the IOT female connector and the IOT male connector are disposed on different sides of the enclosure such that the IOT gateway is configured to be disposed between and operatively connect the ECM and the WHAC, wherein the WHAC is configured for connection with one or more other components of the internal combustion industrial engine;

a printed circuit board (PCB) positioned within the enclosure;

an electromagnetic (EM) shield positioned inside the enclosure of the IOT gateway, wherein the EM shield is disposed between the ECM and the PCB and is configured to direct EM radiation from the ECM away from the PCB; and a cellular modem, wherein the cellular modem enables the IOT gateway to receive, process, and transmit performance data received by the IOT gateway from the ECM mounted on the internal combustion industrial engine.

2. The IOT gateway of claim 1, wherein the total surface area of the IOT gateway is less than twice the total area consumed by the WHAC when the IOT gateway is operatively attached to the WHAC.

3. The IOT gateway of claim 2, wherein dimensions of the enclosure are one inch or less in height, two inches or less in width, or one inch or less in depth.

4. The IOT gateway of claim 2, wherein dimensions of the enclosure are less than two inches in height, less than four inches wide, or less than two inches in depth.

5. The IOT gateway of claim 1, comprising:

an internal cellular antenna configured and arranged to receive and transmit cellular data; and an antenna port configured and arranged for operative connection to an external antenna.

6. The IOT gateway of claim 1, wherein the cellular modem comprises a cellular modem having an embedded Low-Power Wide-Area (LPWA) module.

7. The IOT gateway of claim 6, wherein the LPWA module uses a cellular protocol, the cellular protocol comprising one or more of Long Term Evolution Category 1 (LTE Cat 1), LTE-M (Cat M1), or Narrow-Band Internet of Things (NB-IOT).

8. The IOT gateway of claim 1, wherein the EM shield is positioned across a bottom section of the IOT gateway.

9. The IOT gateway of claim 1, wherein the IOT male connector includes two horizontal guides configured to guide male pins of the IOT male connector, wherein the two horizontal guides ensure the male pins are properly seated within the WHAC female connector.

10. The IOT gateway of claim 1, wherein:

the IOT female connector is disposed on a first side of the enclosure facing the ECM; and the IOT male connector is disposed on a second side of the enclosure, opposite the first side, facing the WHAC.

11. The IOT gateway of claim 1, wherein the IOT female connector and the IOT male connector are disposed on different sides of the enclosure such that a connection between ECM and WHAC is configured to be retrofit by operatively disposing the IOT gateway between, and operatively connecting, the ECM and the WHAC.

12. The IOT gateway of claim 1, wherein the EM shield is disposed entirely between the ECM and the PCB and is configured to direct EM radiation from the ECM away from the PCB.

13. A system comprising:

an internal combustion industrial engine;

an engine control module (ECM) operatively mounted on the internal combustion industrial engine;

a wire harness assembly connector (WHAC) coupled to one or more other components of the internal combustion industrial engine; and an Internet of Things (IOT) gateway for use with the ECM, the IOT gateway comprising:

an enclosure;

an IOT female connector configured for first operative connection to a corresponding ECM male connector of the ECM, wherein the IOT female connector is the same as a WHAC female connector of the WHAC such that each of the IOT female connector and the WHAC female connector are configured for operative connection with the ECM male connector;

an IOT male connector configured for second operative connection to the corresponding WHAC female connector, wherein the IOT male connector is the same as the ECM male connector such that each of the IOT male connector and the ECM male connector are configured for operative connection with the WHAC female connector, wherein the IOT female connector and the IOT male connector are disposed on different sides of the enclosure such that the IOT gateway is configured to be disposed between and operatively connect the ECM and the WHAC, wherein the WHAC is coupled with one or more other components of the internal combustion industrial engine;

a printed circuit board (PCB) positioned within the enclosure;

an electromagnetic (EM) shield positioned inside the enclosure of the IOT gateway, wherein the EM shield is disposed between the ECM and the PCB and is configured to direct EM radiation from the ECM away from the PCB; and a cellular modem, wherein the cellular modem enables the IOT gateway to receive, process, and transmit performance data received by the IOT gateway from the ECM mounted on the internal combustion industrial engine.

14. The system of claim 13, wherein dimensions of the enclosure are less than two inches in height, less than four inches wide, and less than two inches in depth.

15. The system of claim 13, wherein the total surface area of the IOT gateway is less than twice the total area consumed by the WHAC when the IOT gateway is operatively attached to the WHAC.

\* \* \* \* \*